United States Patent [19]

Nojima

[11] Patent Number: 4,583,400
[45] Date of Patent: Apr. 22, 1986

[54] FLOW METER

[75] Inventor: Shin-ichi Nojima, Tokyo, Japan

[73] Assignee: Tokico Ltd., Kanagawa, Japan

[21] Appl. No.: 629,592

[22] Filed: Jul. 11, 1984

[30] Foreign Application Priority Data

Jul. 11, 1983 [JP] Japan .................. 58-107284[U]

[51] Int. Cl.⁴ .................................. G01F 3/18
[52] U.S. Cl. ......................................... 73/247
[58] Field of Search ................... 73/247, 239

[56] References Cited

U.S. PATENT DOCUMENTS

| 2,198,759 | 4/1940 | Cadet | 73/247 |
| 2,718,276 | 9/1955 | Grise | 73/247 |
| 3,822,699 | 7/1974 | Cleary | 73/239 |

FOREIGN PATENT DOCUMENTS

| 0003889 | 9/1979 | European Pat. Off. |
| 1392795 | 4/1975 | United Kingdom |
| 2022733 | 12/1979 | United Kingdom |
| 2042108 | 9/1980 | United Kingdom |
| 1592817 | 7/1981 | United Kingdom |

Primary Examiner—Donald O. Woodiel
Attorney, Agent, or Firm—Wenderoth, Lind & Ponack

[57] ABSTRACT

A flow meter including a housing having inlet and outlet ports, at least two associated pistons provided respectively in respective cylinders in the housing, metering chambers defined respectively on one sides of respective pistons, passages formed in the housing for communicating the metering chambers with inlet and outlet ports, and a valve mechanism provided in the housing and associated with the movement of pistons for communicating either of the metering chambers with the inlet port and communicating the other of metering chambers with the outlet port. A check valve is provided in a passage between the inlet port and the valve mechanism for permitting liquid flow from the inlet port to the valve mechanism and preventing the liquid flow in the reverse direction.

2 Claims, 2 Drawing Figures

FLOW METER

BACKGROUND OF THE INVENTION

This invention relates to a liquid flow meter of the reciprocating piston type for use in such as an oil supplying apparatus or an LPG filling apparatus.

Usually, a liquid flow meter of the reciprocating piston type comprises a housing having inlet and outlet ports, at least two pistons provided in respective cylinders in the housing, metering chambers defined on first sides of respective of the pistons, passages formed in the housing for communicating the metering chambers with the inlet and outlet ports and a valve mechanism provided in the housing and associated with the movement of the pistons for communicating either of the metering chambers with the inlet port and the other of the metering chambers with the outlet port. When the pistons are reciprocatingly moved by the pressure of liquid supplied through the inlet port, the liquid flows into and out of respective metering chambers. The number of reciprocating movements of the pistons is converted into a number of rotations of a rotating shaft by a suitable device such as a cam mechanism and is detected as, e.g., pulse signals and is transmitted to an indicator.

The flow meter of the aforementioned type has a high sensitivity and is adapted to detect a very small liquid flow, thus, it has been used widely in oil supplying apparatus or LPG filling apparatus. However, there is a shortcoming such that a change of the liquid pressure due to starting or stopping of a liquid supplying pump, pulsations of the liquid pressure caused by such as a reciprocating type liquid supplying pump, or the water hammer phenomenon due to closing of a liquid delivering valve in such as an LPG filling apparatus sometimes effect the pistons in the flow meter, whereby the pistons move momentarily and rotate the cam mechanism. As a result, the indications of the flow meter become incorrect. Heretofore, a check valve has been incorporated in a pipe line which connects the flow meter with a liquid supplying, and such check valve opens when the pressure on the upstream side of the pump exceeds a predetermined pressure, and prevents liquid flow toward the pump, so that the flow meter is not affected by such change in the liquid pressure.

In such case, it is required to mount the check valve at a mid portion of the pipe line connecting the pump with the flow meter, thereby complicating the assembling operation and necessitating an additional space for mounting the check valve.

SUMMARY OF THE INVENTION

The present invention aims to overcome the shortcoming aforementioned and, an object of the invention is to provide a flow meter having a high accuracy irrespective of variations in the pressure of the liquid.

Another object of the invention is to provide a flow meter which makes it possible to minimize the size of an apparatus incorporating therein the flow meter.

A further object of the invention is to provide a flow meter which makes it possible to improve the assembling operation of a pipe line connected to the flow meter.

According to the invention, a check valve is provided in a passage between the inlet port and the valve mechanism for permitting liquid flow from the inlet to the valve mechanism and preventing liquid flow in the reverse direction.

Thus, it is possible to simplify the pipe line between the pump and the flow meter.

BRIEF EXPLANATION OF THE DRAWINGS

These and other objects and advantages of the invention will become apparent from the following description taken in connection with the accompanying drawings exemplifying a preferred embodiment of the invention, and in which.

DETAILED DESCRIPTION OF THE INVENTION

Figure 1:
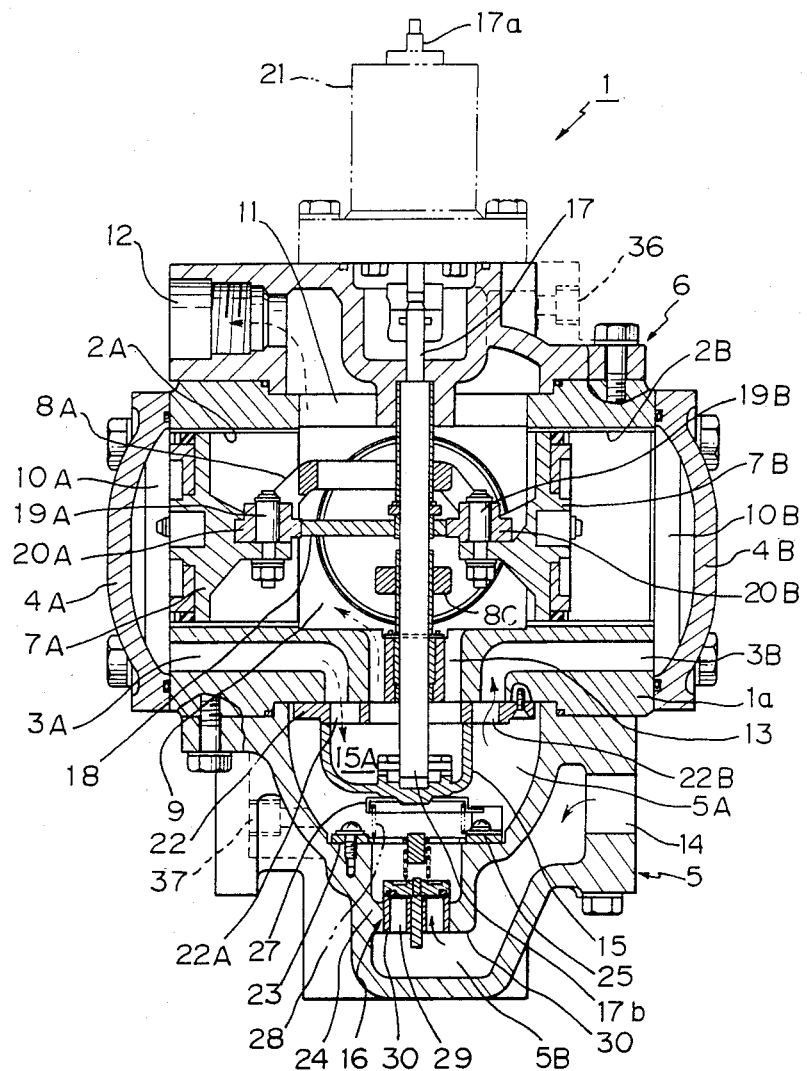
FIG. 1 is a longitudinal sectional view of a flow meter according to the invention.

In the drawings, a flow meter 1 according to the invention comprises a main body 1a which has four horizontally extending radial cylinders 2A, 2B, 2C and 2D (the cylinders 2C and 2D are not shown in FIG. 1). The cylinders 2A and 2B have a common horizontally extending axis, and, the cylinders 2C and 2D have also a common horizontally extending axis which is orthogonal to the axis of cylinders 2A and 2B. The radially inner sides of respective cylinders open to an inner space 9 of the main body 1a. The cylinders 2A, 2B, 2C and 2D receive slidably therein respective pistons 7A, 7B, 7C and 7D (cylinders 7C and 7D are not shown in the drawings), and cylinders 7A and 7B are connected together by a yoke 8A with the cylinders 7C and 7D being connected together through a yoke 8C. Side caps 4A, 4B, 4C and 4D (4C and 4D are not shown in the drawings) are mounted on the main body 1a to cover respectively the radially outer ends of the cylinders 2A, 2B, 2C and 2D and define respectively metering chambers 10A, 10B, 10C and 10D (10C and 10D are not shown in the drawings) in respective cylinders and on radially outer sides of respective pistons 7A, 7B, 7C and 7D. There are provided in the main body 1a passages 3A, 3B, 3C and 3D (passages 3C and 3D are not shown in the drawings) which generally extend radially with first ends being open respectively to respective metering chambers 10A, 10B, 10C and 10D and second ends being open respectively to the lower surface of the main body 1a. A lower cap 5 is mounted on the lower surface of the main body 1a, and an upper cap 6 is mounted on the upper surface of the main body 1a. The main body 1a, the upper and lower caps 6 and 5, and side caps 4A, 4B, 4C and 4D constitute a housing of the flow meter 1 according to the invention.

The inner space 9 of the main body 1a is communicated through an opening 11 formed in the upper wall of the main body 1a with an outlet port 12 which is formed in the upper cap 6. An annular opening 13 is formed in the lower wall of the main body 1a to communicate with the inner space 9.

An inlet opening 14 is formed in the lower cap 5 and is communicated with an inner space 5A of the lower cap 5 through a passage 5B and through a check valve 16 which will be explained hereinafter. A rotary sliding valve member 15 is disposed in the inner space 5A of the lower cap 5 and cooperates with a valve seat 22 which is secured to the lower surface of the main body 1A. The valve member 15 is connected to a rotary sliding shaft 17 through a pin 17C (FIG. 2), and the shaft 17 extends vertically through the inner space 9 of the main body 1A. An eccentric cam 18 is integrally connected to the shaft 17 and engages with rollers 20A, 20B, 20C and 20D (20C and 20D are not shown in FIG. 1) which are respectively mounted rotatably on pistons 7A, 7B, 7C and 7D through pins 19A, 19B, 19C and 19D (19C and 19D are not shown in FIG. 1), whereby the reciprocating movement of pistons 7A~7D is converted into the rotary movement of the shaft 17. The shaft 17 extends through the upper cap 6 and is connected to an elective converter 21 which detects the rotary movement of the shaft 17 and generates corresponding elective signal which, in turn, is transmitted to suitable device such as an indicator or a recorder (not shown). The valve seat 22 cooperating with the valve member 15 has openings 22A, 22B, 22C and 22D (22C and 22D are not shown in the drawings) communicating respectively with passages 3A, 3B, 3C and 3D and a central opening communicating with the opening 13 in the lower wall of the main body 1A. The valve member 15 has a recess or an inner space 15A therein which is permanently communicated with the central opening in the valve seat 22, thus, with the inner space 9 of the main body 1a through the opening 13. Further, in the condition shown in FIG. 2, the opening 22A communicating with the passage 3A is communicated with the inner space 15A of the valve member 15, the opening 22B communicating with the passage 3B is intercepted from communicating with the inner space 15A but is communicated with the inner space 5A of the lower cap 5, further, the openings 22C and 22D are intercepted from communicating with both of the inner spaces 15A and 5A through generally plate-like horizontally extending portions 15C and 15D (15C only is shown by broken lines in FIG. 2). When the valve member 15 rotates from the condition of FIG. 2, the opening 22A is gradually covered by the valve portion 15D, the opening 22C is gradually communicated with the inner space 15A, the opening 22B is gradually covered by the valve portion 15C and the opening 22D is gradually communicated with the inner space 5A. When the valve member 15 rotates 90 degrees from the position FIG. 2, the openings 22A and 22B are fully closed, the opening 22C is communicated with the inner space 15A and the opening 22D is communicated with the inner space 5A.

Figure 2:
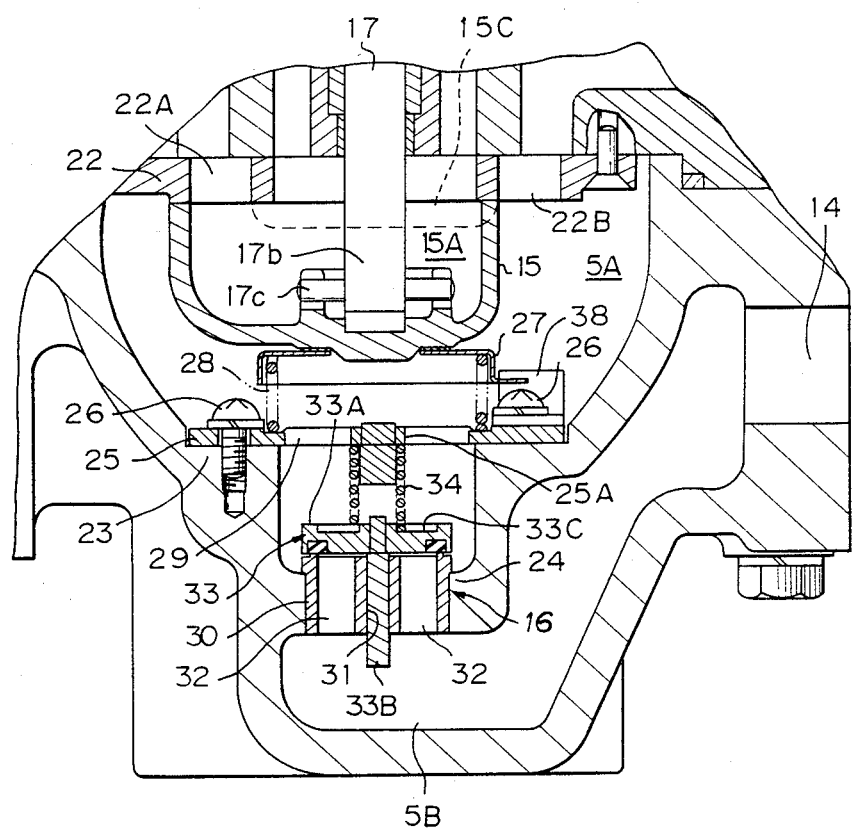
FIG. 2 is a partial enlarged view of FIG. 1.

An annular upwardly facing step 23 is formed in the lower cap 5 to mount thereon a spring retainer 25. The spring retainer 25 is secured to the lower cap 5 through a plurality of screws 26 and supports thereon a coil spring 28, the upper end of which acts on a spring seat 27, and the spring seat 27 engages with the lower end of the valve member 15 to urge it slidably against the valve seat 22. Further, there are provided in the spring retainer 25 a plurality of vertical holes 29, and a downwardly facing retaining portion 25A is provided on the central portion of the spring retainer 25. Shown at 38 in FIG. 2 is a rotation preventing member for preventing the rotation of the spring seat 27 which would otherwise be induced from the rotary movement of the valve member 15.

The check valve 16 is provided according to the invention. The check valve 16 consists of a generally tubular valve seat member 30 fitted in an opening 24 in the lower cap 5 and a valve member 33 normally seating on an annular seating surface which is defined on the upper end of the valve seat member 30. The valve seat member 30 has a central guide hole 31 and a plurality of communicating holes 32. The valve member 33 consists of a valve portion 33A of annular plate like configuration and a vertically extending guide rod 33B which engages with the central guide hole 31 of the valve seat member 30. A coil spring 34 is interposed between an upper surface 33C of the valve portion 33A and the retaining portion 25A of the spring retainer 25 to bias the valve portion 33A against the valve seat member 30. When liquid under pressure is introduced through the inlet port 14 into the passage 5B the valve portion 33A separates from the valve seat member 30 and the passage 5B is communicated with the space 5A. Shown at 36 and 37 are liquid pressure detecting openings.

The operation of the flowmeter will now be explained. The inlet port 14 is connected to a pump (not shown) and pressurized liquid is introduced therethrough into the flow meter. The pressurized liquid flows through the passage 5B, the check valve 16, the inner space 5A of the lower cap 5, the opening 22B in the valve seat 22, and the passage 3B into the metering chamber 10B as shown solid line arrows in FIG. 1. The liquid in the metering chamber 10A flows through the passage 3A, the opening 22A in the valve member 22, the space 15A in the valve member 15, the opening 13, the inner space 9 in the main body 1A, the opening 11 and the outlet port 12 out of the flow meter, as shown in broken line arrows in FIG. 1. The pistons 7A and 7B move leftward in FIG. 1 due to the liquid pressure acting on the piston 7B in the metering chamber 10B. The movement of the pistons 7B and 7A is converted into rotary movement of the shaft 17 through the eccentric cam 18. When the opening 22A is opened to the inner space 5A and the opening 22B is communicated with the recess 15A due to the rotational movement of the valve member 15, the pistons 7A and 7B moves rightward in FIG. 1. It will be understood that during the substantial part of the rotational movement of the valve member 15, either of the openings 22A and 22B and either of the openings 22C and 22D are communicated with either of the spaces 5A and 15A and, also the other of the openings 22A and 22B and the other of the openings 22C and 22D are communicated with the other of the spaces 5A and 15A, and thus the rotary movement of the eccentric cam 18 and the shaft 17 is performed smoothly.

The stroke of the pistons 7A~7D is determined by the eccentricity of the eccentric cam 18 and is a constant, thus, the metering chambers 10A~10D discharge a constant volume of liquid in response to the rotation of the shaft 17. Therefore, the amount of liquid flowing through the flow meter can be detected by the rotational movement of the shaft 17.

According to the invention check valve 16 is provided in the upstream side of the valve mechanism 15 and the volume therebetween is reduced substantially. The check valve 16 effectively restricts variations or pulsations of the liquid pressure due to starting, stopping or the operation of the pump and eliminates the water hammer phenomenon which would be transmitted through the outlet port 12 owing to sudden closing of a liquid supplying valve (not shown) or the like of such as a liquid supplying or dispensing apparatus (not shown) connected to the outlet port 12, whereby the accuracy of the flow meter can be maintained. Further, the flow meter can directly be connected to a discharge port of a pump, which makes it possible to minimize the pressure loss between the pump and the flow meter and to reduce the overall dimensions. When the flow meter is incorporated in an LPG filling apparatus including a pump disposed in an LPG tank and an LPG dispenser incorporating therein the flow meter, it is possible to reduce the length of a pipe connecting the pump and the flow meter and, accordingly, to reduce the size of the apparatus and to minimize the pressure loss.

Further, it is possible to simplify the assembling operation between the flow meter and the pump since the flow meter incorporates therein the check valve 16 and, accordingly, to reduce the assembling costs.

What is claimed is:

1. A flow meter comprising:
   a housing formed by a main body and upper and lower caps;
   an inlet port extending into one said cap and an outlet port extending from the other said cap;
   at least two associated pistons mounted for reciprocation in respective cylinders defined in said main body;
   metering chambers defined on first sides of respective said pistons;
   passages formed in said housing for selectively connecting said metering chambers with said inlet and outlet ports;
   a shaft mounted in said main body for rotation in response to reciprocation of said pistons;
   a valve seat formed at a side of said main body adjacent said one cap;
   a rotary valve cooperable with said valve seat and connected to said shaft for rotation therewith to connect one of said metering chambers through respective said passages with said inlet port and to connect the other said metering chamber through respective said passages with said outlet port;
   a spring retainer mounted in said one cap;
   first spring means acting between said spring retainer and said rotary valve for urging said rotary valve against said valve seat;
   check valve means, provided in a passage in said one cap between said inlet port and said rotary valve, for permitting flow from said inlet port to said rotary valve and for preventing flow in the reverse direction;
   second spring means acting between said spring retainer and said check valve means for urging said check valve means in a direction closing said passage in said one cap; and
   said first and second spring means acting in opposite directions.

2. A flow meter as claimed in claim 1, wherein said main body has therein an inner space on second sides of said pistons, said one cap has therein an inner space, said rotary valve has therein an inner space, and said passages in said housing comprise an annular opening in said main body connecting said inner space of said main body with said inner space of said rotary valve, said passages in said main body extending from respective said metering chambers and opening into said inner space of said rotary valve and said inner space of said one cap, depending on the relative position of said roatary valve.

* * * * *